United States Patent Office.

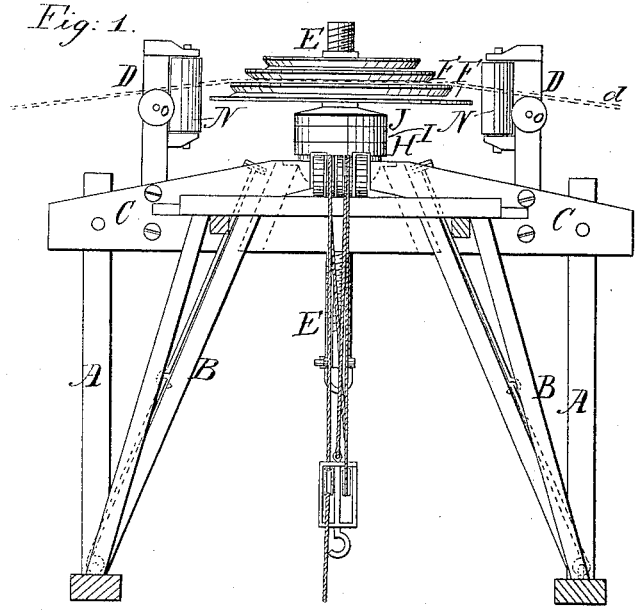
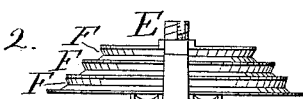
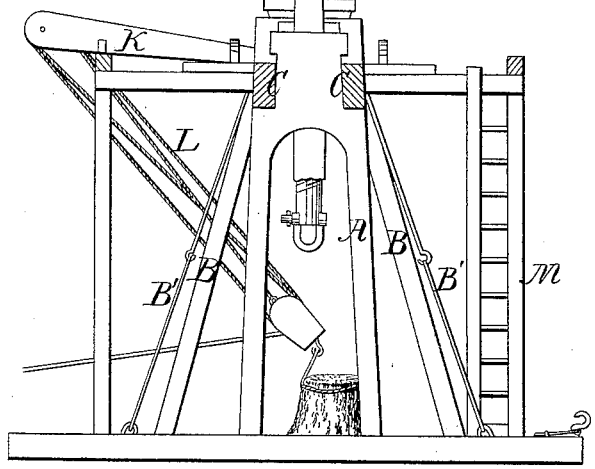
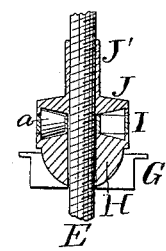

ISAAC D. HAZEN AND JONATHAN HITCHCOCK, OF GRAND RAPIDS, MICHIGAN.

Letters Patent No. 69,209, dated September 24, 1867.

IMPROVEMENT IN STUMP-EXTRACTOR.

The Schedule referred to in these Letters Patent and making part of the same.

TO ALL WHOM IT MAY CONCERN:

Be it known that we, ISAAC D. HAZEN and JONATHAN HITCHCOCK, of Grand Rapids, in the county of Kent, and in the State of Michigan, have invented certain new and useful Improvements in Grubbing and Stump Machines; and do hereby declare that the following is a full, clear, and exact description thereof, reference being had to the accompanying drawings, and to the letters of reference marked thereon.

In the annexed drawings, making part of this specification, A A represent uprights, which are erected upon a suitable base of stout sills. These uprights have framed into them at their upper ends two heavy arched cross-pieces C C, said cross-pieces being placed a little distance apart and parallel to each other. B and B' represent braces, which pass up from the foundation sills to the cross-pieces C C. These uprights, cross-pieces, and braces form the frame of the machine, and being designed for work which requires much power, the several parts are made of sufficient strength to endure the strain. E represents a metallic screw-shaft, which is placed in a vertical position, passing up and being supported, as will be described, between the two cross-pieces C C. J' represents a metallic collar, which has a screw-thread cut in it to fit the thread of the screw-shaft E. This collar is provided with a series of pulleys, F F, which vary in diameter, and which are placed close together one above the other. On the lower end of this collar J' is formed a box, J, which has a flange or rim around its mouth, and its bottom formed to correspond with the surface of, so that it will fit up a conical roller or rollers a a. H represents the half of a metallic ball, which rests in an opening of similar shape in a box, G'. The upper surface of this ball is surrounded with a flange, and said surface is bevelled to correspond with the shape of the conical rollers a a, as seen in fig. 3. a a represent a series of conical rollers, which are secured in a rim-wheel, I, having suitable small axles, which enables them to revolve. This rim-wheel is situated between the box J and the half ball H, the rollers of said wheel being caught between the box and ball. The screw-shaft E passes down through the centres of the box J, wheel I, and ball H, and also through box G down to the stump to be pulled.

In order to draw a stump with this machine the frame is placed over it, and the stump is made fast by chains to the lower end of said shaft. A cord or rope, d, is passed around one of the pulleys F one or more times, and a horse is attached to one end of the rope while the operator holds on to the other end to pay it out. When the pulleys are revolved in this way the shaft E is elevated by the thread upon it, and the stump is gradually drawn from the earth. After the stump has been drawn up as far as the frame will allow it to go, it may be canted to one side by means of the block and tackle L, which is hung to the outer end of a projecting frame, K. This frame consists of several bars supported upon and projecting from the top of the main frame, and having pulleys secured between them at their outer ends for the cord of the tackle to pass through. By means of this tackle the stump is canted to one side so that its roots may be cut or removed, thus releasing the stump. D D represent standards erected upon the cross-pieces C C, which have connected to them the vertical rollers N N and the horizontal rollers o o. The cord d rests against the rollers N and upon the rollers o to prevent friction and wear of the cord.

Having thus fully described our invention, what we claim as new, and desire to secure by Letters Patent, is—

1. The arrangement of shaft E and collar J' with its pulleys and box, with the rim-wheel I and its rollers, ball H, box G, and cord d, as and for the purpose set forth.

2. The arrangement of the frame K with its pulleys and block and tackle with the main frame, for canting or removing the stump after it has been pulled, substantially as set forth.

In testimony that we claim the foregoing we have hereunto set our hands and seals this 8th day of June, 1867.

ISAAC D. HAZEN, [L. S.]
JONATHAN HITCHCOCK. [L. S.]

Witnesses:
W. A. ROBINSON,
NOAH STEVENS.